(12) United States Patent
Eberlein et al.

(10) Patent No.: US 11,269,717 B2
(45) Date of Patent: Mar. 8, 2022

(54) ISSUE-RESOLUTION AUTOMATION

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 174 days.

(21) Appl. No.: 16/580,318

(22) Filed: Sep. 24, 2019

(65) Prior Publication Data
US 2021/0089384 A1    Mar. 25, 2021

(51) Int. Cl.
*G06F 11/07* (2006.01)
*G06K 9/62* (2022.01)
*G06F 11/30* (2006.01)

(52) U.S. Cl.
CPC ........ *G06F 11/0793* (2013.01); *G06F 11/079* (2013.01); *G06F 11/3006* (2013.01); *G06K 9/6201* (2013.01)

(58) Field of Classification Search
CPC .............. G06F 11/0793; G06F 11/079; G06F 11/3006; G06F 11/302; G06K 9/6201
See application file for complete search history.

(56) References Cited

U.S. PATENT DOCUMENTS

| | | | |
|---|---|---|---|
| 7,523,142 B2 | 4/2009 | Driesen et al. | |
| 7,657,575 B2 | 2/2010 | Eberlein et al. | |
| 7,720,992 B2 | 5/2010 | Brendle et al. | |
| 2,199,904 A1 | 6/2010 | Eberlein et al. | |
| 7,739,387 B2 | 6/2010 | Eberlein et al. | |
| 7,757,126 B2 * | 7/2010 | Vidiyala ............. | G06F 11/2294 714/38.14 |
| 7,971,209 B2 | 6/2011 | Eberlein et al. | |
| 8,126,919 B2 | 2/2012 | Eberlein | |
| 8,200,634 B2 | 6/2012 | Driesen et al. | |
| 8,225,303 B2 | 7/2012 | Wagner et al. | |
| 8,250,335 B2 | 8/2012 | Driesen et al. | |
| 8,291,038 B2 | 10/2012 | Driesen | |
| 8,301,610 B2 | 10/2012 | Driesen et al. | |
| 8,356,010 B2 | 1/2013 | Driesen | |
| 8,375,130 B2 | 2/2013 | Eberlein et al. | |

(Continued)

FOREIGN PATENT DOCUMENTS

CN        103368771 A  * 10/2013  ........... H04L 41/069

OTHER PUBLICATIONS

U.S. Appl. No. 15/874,317, filed Jan. 18, 2018, Eberlein et al.
(Continued)

*Primary Examiner* — Yolanda L Wilson
(74) *Attorney, Agent, or Firm* — Fish & Richardson P.C.

(57) ABSTRACT

Implementations of the present disclosure include methods, systems, and computer-readable storage mediums for issue resolution based on actual use of configuration parameters. Actions include receiving, from a monitoring system, an incident report including a description of an issue of a process and a context of the issue, retrieving features associated with the issue based on the context of the issue, processing the features to extract a set of solutions that were executed to resolve associated issues, processing the set of solutions to generate a solution for the issue, comparing an accuracy of the solution with a solution implementation threshold, and implementing the solution to resolve the issue.

20 Claims, 4 Drawing Sheets

(56) References Cited

U.S. PATENT DOCUMENTS

| | | |
|---|---|---|
| 8,380,667 B2 | 2/2013 | Driesen |
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,467,817 B2 | 6/2013 | Said et al. |
| 8,479,187 B2 | 7/2013 | Driesen et al. |
| 8,560,876 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,631,406 B2 | 1/2014 | Driesen et al. |
| 8,645,483 B2 | 2/2014 | Odenheimer et al. |
| 8,706,772 B2 | 4/2014 | Hartig et al. |
| 8,732,083 B2 | 5/2014 | Vasing et al. |
| 8,751,573 B2 | 6/2014 | Said et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,031,910 B2 | 5/2015 | Driesen |
| 9,032,406 B2 | 5/2015 | Eberlein |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,298,539 B1 * | 3/2016 | Kruck .................. G06F 11/302 |
| 9,336,227 B2 | 5/2016 | Eberlein et al. |
| 9,348,929 B2 | 5/2016 | Eberlein |
| 9,354,860 B2 | 5/2016 | Eberlein et al. |
| 9,354,871 B2 | 5/2016 | Eberlein et al. |
| 9,361,326 B2 | 5/2016 | Driesen et al. |
| 9,361,093 B2 | 6/2016 | Meissner et al. |
| 9,367,199 B2 | 6/2016 | Klemenz et al. |
| 9,372,685 B1 | 6/2016 | Luettge et al. |
| 9,436,724 B2 | 9/2016 | Driesen et al. |
| 9,471,659 B2 | 10/2016 | Driesen et al. |
| 9,501,516 B2 | 11/2016 | Driesen |
| 9,519,675 B2 | 12/2016 | Specht et al. |
| 9,569,283 B2 | 2/2017 | Eberlein |
| 9,632,802 B2 | 4/2017 | Said et al. |
| 9,633,107 B2 | 4/2017 | Said et al. |
| 9,639,448 B2 | 5/2017 | Gebhard et al. |
| 9,652,214 B1 | 5/2017 | Eberlein |
| 9,652,744 B2 | 5/2017 | Eberlein et al. |
| 9,672,140 B1 | 6/2017 | Eberlein |
| 9,678,740 B2 | 6/2017 | Heine et al. |
| 9,703,554 B2 | 7/2017 | Eberlein et al. |
| 9,720,994 B2 | 8/2017 | Driesen et al. |
| 9,721,116 B2 | 8/2017 | Driesen et al. |
| 9,740,476 B2 | 8/2017 | Eberlein et al. |
| 9,767,424 B2 | 9/2017 | Biewald et al. |
| 9,800,689 B2 | 10/2017 | Said et al. |
| 9,836,299 B2 | 12/2017 | Eberlein et al. |
| 9,854,045 B2 | 12/2017 | Said et al. |
| 9,858,309 B2 | 1/2018 | Eberlein et al. |
| 9,875,273 B2 | 1/2018 | Eberlein et al. |
| 9,898,279 B2 | 2/2018 | Eberlein et al. |
| 9,898,494 B2 | 2/2018 | Eberlein et al. |
| 9,898,495 B2 | 2/2018 | Eberlein et al. |
| 9,927,992 B2 | 3/2018 | Driesen et al. |
| 10,013,337 B2 | 7/2018 | Eberlein et al. |
| 10,025,568 B2 | 7/2018 | Mayer et al. |
| 10,055,215 B2 | 8/2018 | Specht et al. |
| 10,061,788 B2 | 8/2018 | Said et al. |
| 10,083,061 B2 | 9/2018 | Odenheimer et al. |
| 10,120,886 B2 | 11/2018 | Eberlein et al. |
| 10,157,052 B2 | 12/2018 | Eberlein et al. |
| 10,157,068 B2 | 12/2018 | Arians et al. |
| 10,185,552 B2 | 1/2019 | Eberlein et al. |
| 10,187,393 B2 | 1/2019 | Odenheimer et al. |
| 10,191,733 B2 | 1/2019 | Driesen |
| 10,230,708 B2 | 3/2019 | Eberlein |
| 10,268,472 B2 | 4/2019 | Eberlein et al. |
| 10,268,692 B2 | 4/2019 | Mayer et al. |
| 10,270,743 B2 | 4/2019 | Eberlein |
| 10,282,248 B1 * | 5/2019 | Gudka ................ G06F 11/0751 |
| 10,291,704 B2 | 5/2019 | Eberlein et al. |
| 10,296,324 B2 | 5/2019 | Burkhardt et al. |
| 10,298,591 B2 | 5/2019 | Eberlein et al. |
| 10,303,665 B2 | 5/2019 | Engelko et al. |
| 10,311,077 B2 | 6/2019 | Specht et al. |
| 2006/0171405 A1 | 8/2006 | Brendle et al. |
| 2007/0185720 A1 | 8/2007 | Eberlein et al. |
| 2007/0239800 A1 | 10/2007 | Eberlein |
| 2008/0155544 A1 * | 6/2008 | Soussiel ............. G06F 11/0793 718/100 |
| 2008/0222248 A1 | 9/2008 | Eberlein et al. |
| 2008/0262890 A1 * | 10/2008 | Korupolu ............ G06F 11/0793 705/7.22 |
| 2008/0294931 A1 * | 11/2008 | Bantz .................. G06F 11/2257 714/1 |
| 2009/0106371 A1 | 4/2009 | Schmidt-Karaca et al. |
| 2009/0106372 A1 | 4/2009 | Schmidt-Karaca et al. |
| 2009/0150479 A1 | 6/2009 | Eberlein et al. |
| 2009/0172110 A1 | 7/2009 | Eberlein et al. |
| 2010/0083029 A1 * | 4/2010 | Erickson ............. G06F 11/0709 714/2 |
| 2010/0161648 A1 | 6/2010 | Eberlein et al. |
| 2011/0154445 A1 | 6/2011 | Schmidt-Karaca et al. |
| 2012/0136839 A1 | 5/2012 | Eberlein et al. |
| 2012/0159435 A1 | 6/2012 | Driesen et al. |
| 2012/0023125 A1 | 10/2012 | Driesen et al. |
| 2013/0007527 A1 * | 1/2013 | Petukhov ............ G06F 11/0793 714/37 |
| 2013/0085810 A1 | 4/2013 | Driesen et al. |
| 2013/0144945 A1 | 6/2013 | Said et al. |
| 2013/0166415 A1 | 6/2013 | Odenheimer et al. |
| 2013/0166416 A1 | 6/2013 | Eberlein |
| 2013/0324201 A1 | 12/2013 | Eberlein et al. |
| 2013/0325672 A1 | 12/2013 | Odenheimer et al. |
| 2013/0339488 A1 | 12/2013 | Eberlein et al. |
| 2014/0019429 A1 | 1/2014 | Driesen et al. |
| 2014/0025441 A1 | 1/2014 | Eberlein et al. |
| 2014/0047319 A1 | 2/2014 | Eberlein |
| 2014/0117076 A1 | 5/2014 | Eberlein |
| 2014/0149158 A1 | 5/2014 | Odenheimer et al. |
| 2014/0156724 A1 | 6/2014 | Said et al. |
| 2014/0164963 A1 | 6/2014 | Klemenz et al. |
| 2014/0325069 A1 | 10/2014 | Odenheimer et al. |
| 2015/0006608 A1 | 1/2015 | Eberlein et al. |
| 2015/0188890 A1 | 7/2015 | Said et al. |
| 2015/0220576 A1 | 8/2015 | Eberlein |
| 2015/0220591 A1 | 8/2015 | Eberlein et al. |
| 2015/0222665 A1 | 8/2015 | Eberlein et al. |
| 2016/0026698 A1 | 1/2016 | Eberlein et al. |
| 2016/0063050 A1 | 3/2016 | Schoen et al. |
| 2016/0098253 A1 | 4/2016 | Hutzel et al. |
| 2016/0127325 A1 | 5/2016 | Odenheimer et al. |
| 2017/0102989 A1 * | 4/2017 | Kotikalapudi ........ G06F 11/076 |
| 2017/0103226 A1 | 4/2017 | Eberlein et al. |
| 2017/0116296 A1 | 4/2017 | Specht et al. |
| 2017/0161291 A1 | 6/2017 | Specht et al. |
| 2017/0161511 A1 | 6/2017 | Eberlein et al. |
| 2017/0286467 A1 | 10/2017 | Eberlein et al. |
| 2017/0329505 A1 | 11/2017 | Richter et al. |
| 2017/0344362 A1 | 11/2017 | Burkhardt et al. |
| 2017/0351442 A1 | 12/2017 | Specht et al. |
| 2018/0041568 A1 | 2/2018 | Eberlein |

(56) References Cited

U.S. PATENT DOCUMENTS

| | | |
|---|---|---|
| 2018/0081668 A1 | 3/2018 | Eberlein |
| 2018/0095953 A1 | 4/2018 | Mayer et al. |
| 2018/0129676 A1 | 5/2018 | Eberlein et al. |
| 2018/0137010 A1 | 5/2018 | Mayer et al. |
| 2018/0137145 A1 | 5/2018 | Mayer et al. |
| 2018/0137146 A1 | 5/2018 | Mayer et al. |
| 2018/0144117 A1 | 5/2018 | Engler et al. |
| 2018/0146056 A1 | 5/2018 | Eberlein |
| 2018/0189130 A1* | 7/2018 | Mowry ............... G06F 11/0781 |
| 2018/0268154 A1 | 9/2018 | Specht et al. |
| 2018/0285097 A1 | 10/2018 | Radermacher et al. |
| 2018/0285390 A1 | 10/2018 | Mayer et al. |
| 2018/0300332 A1 | 10/2018 | Odenheimer et al. |
| 2018/0316685 A1 | 11/2018 | Eberlein et al. |
| 2018/0316772 A1 | 11/2018 | Eberlein et al. |
| 2018/0329930 A1 | 11/2018 | Eberlein et al. |
| 2018/0331927 A1 | 11/2018 | Eberlein et al. |
| 2018/0336365 A1 | 11/2018 | Eberlein et al. |
| 2018/0370033 A1* | 12/2018 | Geffen .................. G06F 11/07 |
| 2018/0373767 A1 | 12/2018 | Specht et al. |
| 2019/0007420 A1 | 1/2019 | Eberlein et al. |
| 2019/0018874 A1 | 1/2019 | Eberlein et al. |
| 2019/0034460 A1 | 1/2019 | Eberlein |
| 2019/0129985 A1 | 5/2019 | Schlarb et al. |
| 2019/0129986 A1 | 5/2019 | Birn et al. |
| 2019/0129988 A1 | 5/2019 | Auer et al. |
| 2019/0129990 A1 | 5/2019 | Schlarb et al. |
| 2019/0129991 A1 | 5/2019 | Auer et al. |
| 2019/0129997 A1 | 5/2019 | Auer et al. |
| 2019/0130010 A1 | 5/2019 | Auer et al. |
| 2019/0130121 A1 | 5/2019 | Birn et al. |
| 2019/0166209 A1 | 5/2019 | Mueller et al. |
| 2019/0171514 A1* | 6/2019 | Chowdhury .......... G06F 3/0647 |
| 2019/0190912 A1 | 6/2019 | De boer et al. |
| 2019/0207922 A1 | 7/2019 | Eberlein |
| 2019/0220289 A1 | 7/2019 | Driesen et al. |
| 2019/0220529 A1 | 7/2019 | Eberlein et al. |
| 2019/0238426 A1 | 8/2019 | Eberlein |
| 2021/0026683 A1* | 1/2021 | Ranjan ................. G06F 11/302 |

OTHER PUBLICATIONS

U.S. Appl. No. 15/847,627, filed Dec. 19, 2017, Boer et al.
U.S. Appl. No. 15/883,680, filed Jan. 30, 2018, Eberlein.
U.S. Appl. No. 15/970,499, filed May 3, 2018, Eberlein et al.
U.S. Appl. No. 15/983,812, filed May 18, 2018, Eberlein et al.
U.S. Appl. No. 16/173,225, filed Oct. 29, 2018, Eberlein et al.
U.S. Appl. No. 16/200,427, filed Nov. 26, 2018, Mueller et al.
U.S. Appl. No. 16/208,920, filed Dec. 4, 2018, Eberlein et al.
U.S. Appl. No. 16/214,724, filed Dec. 10, 2018, Eberlein et al.
U.S. Appl. No. 16/219,358, filed Dec. 13, 2018, Eberlein et al.
U.S. Appl. No. 16/219,371, filed Dec. 13, 2018, Eberlein et al.
U.S. Appl. No. 16/219,375, filed Dec. 13, 2018, Eberlein.
U.S. Appl. No. 16/297,057, filed Mar. 8, 2019, Eberlein.
U.S. Appl. No. 16/402,453, filed May 3, 2019, Eberlein.
U.S. Appl. No. 16/410,076, filed May 13, 2019, Eberlein et al.
Quora: "What Can I Use to Quickly Build a Labeling Tool for My Training Data?" Jul. 16, 2019, [Retrieved on Sep. 17, 2019], retrieved from: URL <https://www.quora.com/What-can-I-use-to-quickly-build-a-labeling-tool-for-my-training-data>, 7 pages.
Labelbox, "Build Computer Vision Products for the Real World" Sep. 12, 2019, [Retrieved on Sep. 17, 2019], retrieved from: URL <https://labelbox.com/>, 4 pages.
Tagtog, "A Text Annotation Tool to Train AI", Jul. 14, 2019, [Retrieved on Sep. 17, 2019], retrieved from: URL <https://www.tagtog.net/>, 24 pages.

* cited by examiner

ISSUE-RESOLUTION AUTOMATION

BACKGROUND

Systems with a large set of configuration parameters have a large number of possible combinations of parameters and situations that determine numerous operation processes. Over time, as the system service matures, operation processes may become automated. The remaining effort to operate is in handling erroneous situations. System errors are difficult to foresee, which raises complications in designing automatic reactions to solve system errors.

When solving system errors, such as problems occurring with information technology (IT) procedures, IT personnel analyzes data and executes processes on the landscape to identify solutions for the problems. Expertise of the IT personnel can be difficult to capture or to replicate. When an error situation is automated, a developer starts with reconstruction of an entire process and often needs input from an operation team, which can delay progress of an automation effort.

SUMMARY

The present disclosure describes techniques for issue resolution.

In a particular implementation, an incident report including a description of an issue of a process and a context of the issue are received from a monitoring system. Features associated with the issue based on the context of the issue are retrieved. The features are processed to extract a set of solutions that were executed to resolve associated issues. The set of solutions is processed to generate a solution for the issue. It is determined whether an accuracy of the solution exceeds a solution implementation threshold, and in response to determining that the accuracy of the solution exceeds the solution implementation threshold, the solution to resolve the issue is implemented. In some implementations, the features associated with the issue are retrieved by performing a pattern-matching algorithm based on the context of the issue. The solution to resolve the issue can be implemented by scheduling the solution for automation by a development system. A set of parameters of a processing system executing the process based on annotations of the set of solutions can be retrieved. The solution to resolve the issue can be implemented by updating the set of parameters of the processing system to correctly perform the process. The solution to resolve the issue can be implemented by updating the process.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented so as to realize one or more of the following advantages. First, implementations of the present disclosure can include a modification of an information technology (IT) landscape to provide information about processes, issues, and solutions to support issue resolution automation, thereby reducing errors, as well as reducing an amount of maintenance (for example, human input). For example, maintenance can be reduced by triggering automated procedures to identify issue resolutions based on relevant past issue resolutions. Under the described approach, the IT landscape includes an issue resolution automation system configured to apply rules to extract data relevant for determining a solution, which is processed by an action proposer component to speed up the issue resolution process. Second, a proposal system provides issue insight data by automatically retrieving previous solutions of correlated issues based on annotations and recommends an issue resolution (for example, software code improvement). Third, not all process parameters need to be copied for issue resolution. Using the described implementation enables time and resource management, such that only relevant data is extracted from the database for transmission and only data associated with new issue types are stored using formats that minimize storage requirements (for example, as text annotations). Fourth, the disclosed system enables automated procedures to identify issue resolutions and to update relevant software or hardware parameters before restarting a process that generated detected issues.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
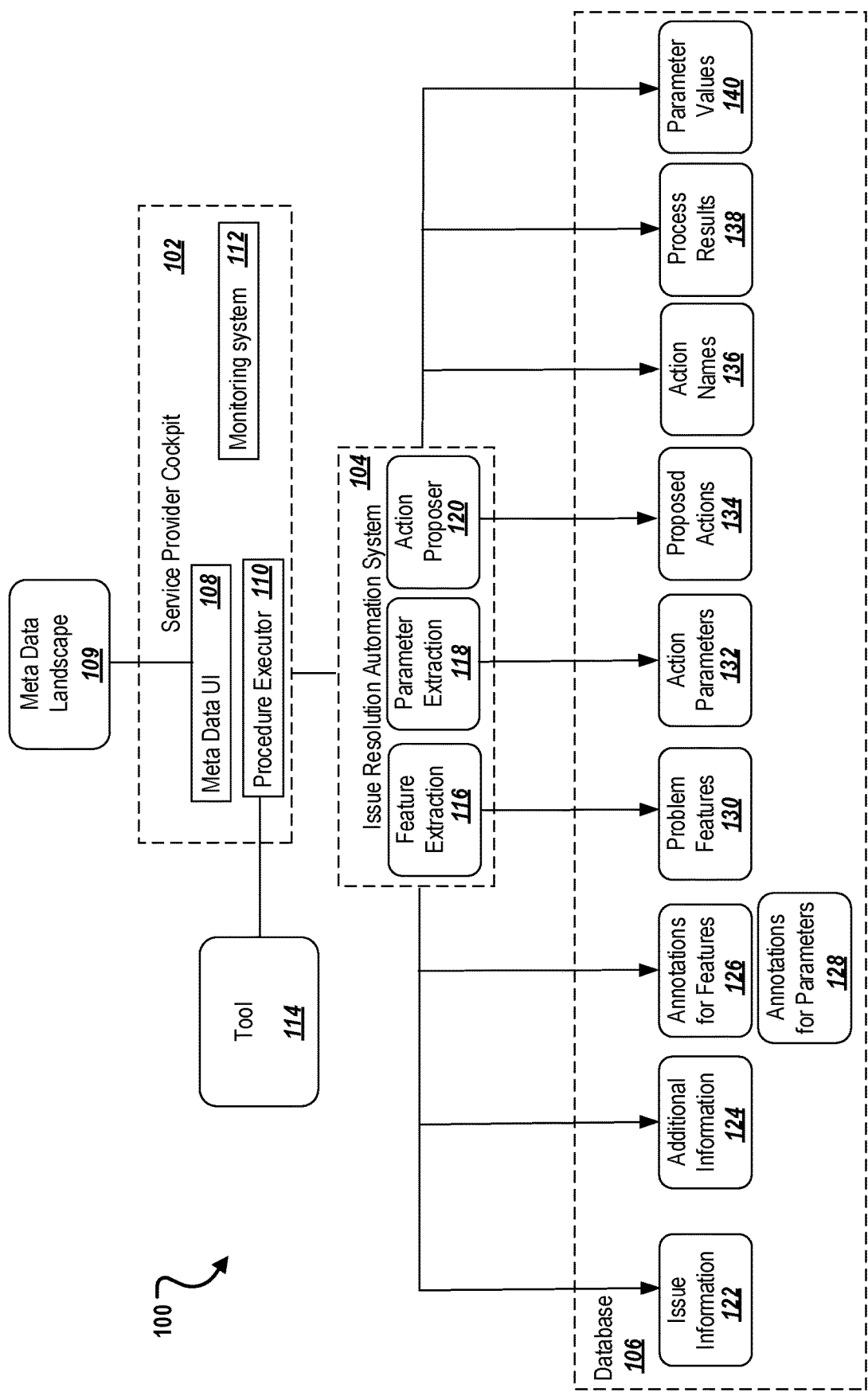
FIG. 1 is a block diagram illustrating component/data relationships for an issue resolution framework, according to an implementation of the present disclosure.

The following detailed description describes techniques for performing issue resolution in an information technology (IT) landscape and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

IT landscapes are architectures including multiple different technologies and components that are operated by multiple IT personnel (for example, developers and operators). Each developer and operator of the IT landscape has knowledge (for example, expertise) associated with a limited portion (less than total) of the technologies and components integrated in the IT landscape. A system to support issue resolution automation within IT landscapes can assist developers and operators with managing projects through a single dashboard with functionalities, such as issue highlighting and aiding in resolution types/analysis, solution look-up, flexible and configurable issue resolution support, and solution implementation.

Several problems exist in current IT landscape issue resolution procedures. First, for example, when solving problems occurring with IT procedures, IT personnel analyze data and execute processes on the IT landscape to resolve an issue. The expertise used to resolve the issue is usually not captured. When a similar issue situation appears at a later time, a developer typically restarts a new analysis (without taking using data from a previous similar analysis) and, sometimes, asks another developer or operator for input. Reanalyzing each issue that appears within the IT landscape without using the knowledge gained from resolving past issues can delay automation progress.

Further, under current IT frameworks, developers look for information regarding software programs in several places, if they wish to correctly resolve issues related to multiple technologies and components. For example, to analyze complex issues and to collect relevant configuration parameters, developers typically have to work through multiple computer infrastructures by searching for configurations and mapping the configurations to an issue. Such a process is cumbersome and requires additional actions from the developers. Because configuration parameters are available only if the developers actually search for the configuration parameters, analysis and association of configuration parameters to issues is often skipped as unnecessary or simply due to a lack of time or other resources.

Additionally, modifications of an IT landscape are associated with modifications of configuration parameters. The modified configuration parameters transmitted to applications, to services, and to a database (DB) can have an impact on executing code. Applications are composites not only of code but also of configurations, database content, and calls to external services. A configuration can define processes to run for particular locations (for example, countries) or industries. Individual requirements of a customer with respect to process definitions can be configured using configuration parameters. Typically, configurations are not independent, such that "verticalization and globalization" can become a major problem with respect to scope. Existent software can be reconfigured as enabled for additional countries and additional industries (for example, according to country specific legal constraints, habits or client preferences). As a result, possible configuration combinations are countless. For example, a database can store tens of thousands of configuration parameters. Even though not all configurations are dependent within one end-to-end process, there still are countless possible configuration combinations. For example, a human resources configuration can be independent of a logistics configuration within one end-to-end process, such as an order to cash or sell from stock.

Considering the large number of possible configuration parameters and interdependencies, a comprehensive coverage of the possible configurations is not practically achievable. Techniques for configuration issue resolution can identify relevant parameters to define an optimal collection of configuration parameter sets to efficiently use available resources allocated to test runs.

Described is a configuration parameter analysis and association system for use with an IT landscape that can provide additional information from past resolved issues and can be used to simplify and to optimize issue resolution with less human interaction. Here, "better" is used in the sense of, among other things as will be appreciated by those of ordinary skill in the art, improved performance, less resource usage, easier to extend, and less impact on a software change to production. The described solution takes into account system development from data collection for use by machine learning of an issue resolution proposal system to fully automate an issue resolution system. The described solution provides resolution of detected issues and optimization of software or system configurations. In this way, an IT landscape can be updated with configurations that improve processes and applications.

FIG. 1 is a block diagram illustrating component/data relationships for an IT landscape 100 that employs a real-time issue analysis and solution implementation, according to an implementation of the present disclosure. FIG. 1 is provided for example purposes only to enhance understanding of the presented concepts. As will be appreciated for those of ordinary skill in the art, there are a myriad of possible ways to present or to arrange the presented components, to structure their interactions, or to describe inter/intra-component interactions/communications. In as far as they are consistent with this disclosure, the other possible presentations or arrangements, structures, or descriptions are considered to be within the scope of this disclosure.

At a high-level and in some implementations, the described IT landscape 100 includes a service provider cockpit (SPC) 102, an issue-resolution automation system (IRAS) 104, and a database 106. The SPC 102 can execute procedures with parameters. The procedures executed by SPC 102 are defined in SPC 102 and can call external tools and services (for example, an upgrade tool or database backup). Examples for procedures can include: provisioning a tenant for a particular product, upgrading an instance, triggering a backup, triggering a high availability failover, or triggering a system update (for example, hardware extension or update).

The SPC 102 can be configured to capture, which information (for example, issue data) is detected and viewed. In some implementations, the issue data is collected by a monitoring agent reading data from an operating system, a database (for example, an in-memory database such as SAP HANA), or an application server (for example, SAP ABAP). The database and the application server can provide monitoring application programming interfaces (APIs) to read statistical data about runtime. For example, an ABAP system can write log entries each time some type of event occurs (such as, when a transaction or a report is called). The system then can evaluate the log entries and extract entries associated with errors. The collected statistical data is associated with the use of the application systems or the tenants running the software, and can include, for example, performance data, data volumes, or usage statistics. The SPC 102 includes a meta-data user interface 108, a procedure executor 110, and a monitoring system 112.

The meta-data user interface 108 can be configured to retrieve metadata (for example, procedure names, attributes, or descriptions) from a meta-data landscape 109. The procedure executor 110 can execute procedures defined by one or more parameters. The procedure executor 110 can call external tools and services 114 (for example, an upgrade tool or database backup). The monitoring system 112 collects and computes statistical values of the data collected by the meta-data user interface 108 and the procedure executor 110, to detect error situations with their context information. During a learning phase, the software artifacts detected by the monitoring system 112 can be known artifacts (for example, the information can be transmitted with the software to the production operation system). For the known artifacts, the issue parameters can be manually identified and collected (for example, during critical performance, for selected configurable software modules). The configuration parameters of the incidents associated with known artifacts can be selected (for example, for a call stack and dump, the parameters can be selected from the stack or from a monitoring report). During a proposal phase or an automatic issue resolution phase, the monitoring system 112 can be configured to automatically detect errors based on one or more rules. The monitoring system 112 can be configured to detect error situations with their context information and to generate an incidence report. The SPC 102 can transmit the incident report to the IRAS 104.

The IRAS 104 is used to collect and to store data information associated with issues for further processing and analysis to generate a solution to resolve the issue. The IRAS 104 includes a feature extraction component 116, a parameter extraction component 118, and an action proposer 120. The feature extraction component 116 can be configured to communicate with the database 106 to retrieve features associated with the issues to be resolved. The feature extraction component 116 can retrieve issue information from an issue information module 122 of the database 106. The feature extraction component 116 can retrieve additional information from an additional information module 124 of the database 106. The feature extraction component 116 can retrieve annotations for features from a feature annotation module 126 of the database 106. The feature extraction component 116 can retrieve annotations for parameters from a parameter annotation module 128 of the database 106. The feature extraction component 116 can retrieve problem features from a problem feature module 130 of the database 106.

The parameter extraction component 118 can be configured to communicate with the database 106 to retrieve parameters associated with the issues to be resolved. For example, the parameter extraction component 118 can be configured to retrieve action parameters from the action parameter module 132 of the database 106.

The action proposer 120 can be configured to communicate with the database 106 to retrieve action data and implement actions associated with the issues to be resolved. For example, the action proposer 120 can be configured to retrieve proposed actions from an action proposal module 134 of the database 106. The action proposer 120 can be configured to retrieve action names from an action name module 136 of the database 106. The action proposer 120 can be configured to retrieve process results from a process result module 138 of the database 106. The action proposer 120 can be configured to retrieve parameter values from a parameter value module 140 of the database 106. The IRAS 104 can call SPC 102 with the action name 136 and the parameter values 140. The SPC 102 can call the resolving action automatically. In response to determining that the issue was resolved, the SPC 102 can call the failed process with a particular command (for example, "restart" or "resume") and determine an outcome of the solution implementation by determining whether the issue or a related issue reoccurs.

The data generated during issue resolution process can be stored in the database 106. In some implementations, data storage is filtered based on data types, such that only data associated to new issues and solutions is stored to optimize data storage based on relevance. The data stored in the database 106 can be collected and stored by multiple modules (for example, the issue information module 122, the additional information module 124, the feature annotation module 126, the parameter annotation module 128, the problem feature module 130, the action parameter module 132, the action proposal module 134, the action name module 136, the process result module 138, and the parameter value module 140). Each of the modules of the database 106 can process the allocated data to generate statistical values of the collected data.

In some implementations, the IT landscape 100 can process issue data and configuration parameters, and then use different algorithms to determine solutions to resolve the issue (for example, configuration optimization) based on past associated issue data retrieved from the database 106. In some implementations, the algorithms used for this purpose can be generic algorithms (for example, clustering algorithms), which are not necessarily designed explicitly for issue resolution. The algorithms can also be "expert algorithms", which are created for a particular issue resolution, and integrated with expert knowledge (for example, algorithms used to relate deployment runtime to parameter characteristics and to change the configuration parameters to provide an optimized configuration). The algorithms can be exposed by directly using an API to the IT landscape 100 enabling the return of the data to a request. The algorithms can be configured to generate software code or a library parametrization, so that IT landscape 100 can access the generated software code with an API provided to the IT landscape 100. In other words, the algorithm can be used by the IT landscape 100 to optimize configurations upon a request or to generate software code so that the IT landscape 100 can access the software code through an API.

Figure 2:
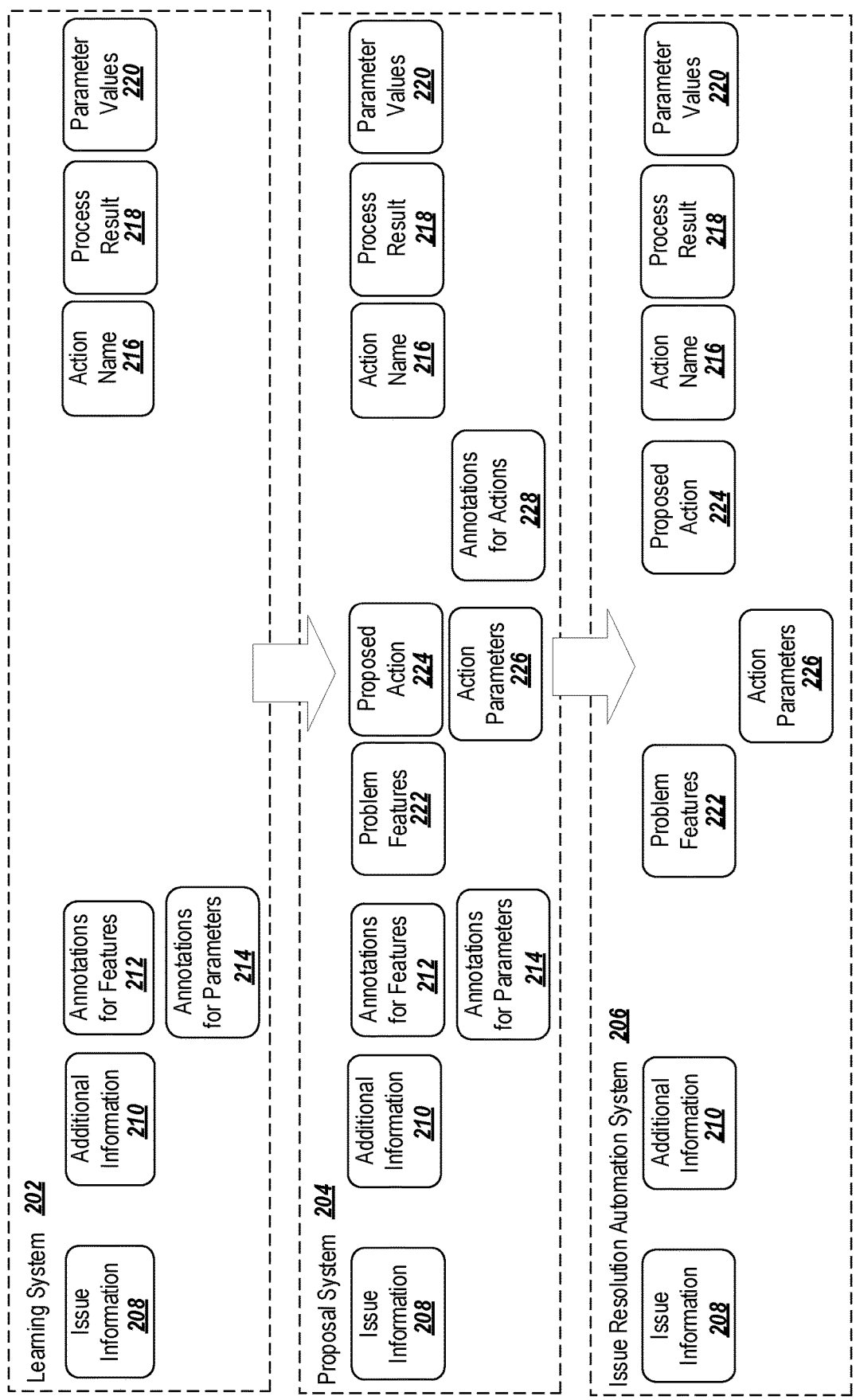
FIG. 2 is a block diagram of example of an issue resolution landscape, according to an implementation of the present disclosure.

FIG. 2 is a block diagram of example of an issue resolution landscape, according to an implementation of the present disclosure. FIG. 2 schematically depicts an example issue resolution schema 200. The example issue resolution schema 200 can include a learning system 202, a proposal system 204, and an issue resolution automation system (IRAS) 206 (for example, IRAS 104 of FIG. 1).

The learning system 202 can be configured to capture data of the operator while it resolves issues within the example configuration optimization schema 200. The learning system 202 can be configured to initiate a data capture protocol, during which each relevant data type is either automatically collected or requested to be entered as a user input for a learning optimization process. Every program calling another program passes parameters. The learning system 202 can be configured to perform monitoring functions to collect parameters for "to be monitored" functions. The learning system 202 can be configured to collect data from the IT landscape based on a parameter set (for example, in response to detecting an error). The learning system 202 can be configured to store parameter data with attributes to allow mapping of captured data to particular software functions. The learning system 202 can include data annotation components for annotations of features 212 and parameters 214. The data annotation components can include tools to mark data points (for example, features and parameters) in structured data (for example, JavaScript Object Notation (JSON) or Extensible Markup Language (XML) tags). In some implementations, the learning system 202 can be configured to enable annotations of a viewed document directly in the document as plain text.

For example, in response to detecting an error, the operator can enter a user input to define issue information 208 (for example, process information or error context), additional information 210 (for example, context information including data visualized during the troubleshooting process), annotations for features 212 and annotations for parameters 214. In response to finding a solution, the operator can schedule an action(s) by an SPC (for example, SPC 102, described with reference to FIG. 1). The actions can be parametrized (for example, with the instance ID) to work on the impacted service instances. The issue information 208, the additional information 210, the annotations 212, 214, the action names 216, the process result 218, and the parameter values 220 can be captured by the learning system 202. The data captured by the learning system 202 can be selectively stored as reference for future issue resolution procedures. In response to collecting sufficient issue resolution data (for example, based on issue occurrence frequency or based on collected issue types) the learning system 202 can be replaced by the proposal system 204.

The proposal system 204 can use collected data to generate one or more proposed actions 122 based on an automation process. In some implementations, each of the one or more proposed actions 122 can be provided with a probability of success. Each of the one or more proposed actions 122 can be based on collected data associated with past issue resolutions. The collected data includes data generated by the learning system 202 and additional data associated to each additional issue that was resolved. The automation process can apply a first set of rules defining the extraction of problem features 222 from the procedure issue information 208. The automation process can apply a second set of rules defining the extraction of parameter values 220 from the procedure issue information 208. The automatic extraction of problem features 222 and of parameter values 220 can be based on annotations for features 212 and annotations for parameters 214, respectively. In some implementations, the proposal system 204 provides information that enables a user to script the feature extraction or define rules.

The proposal system 204 can be configured to select problem features 222 and parameter values 220, which are relevant for issue analysis to generate a proposed action 224. For example, proposal system 204 can be configured to select the parameters associated with the issues (for example, action names 216), which were successfully called (for example, successful process results 218) by the issue resolution units of the learning system 202. The proposal system 204 can provide for display the proposed action 224. The learning system 202 can be configured to receive input on the proposed action 224 (for example, action changes proposed by operator), to process the (modified) proposed action 224 and to monitor process results 218. The issue resolution data monitored by the learning system 202 can be enriched by extracted problem features 222 and action parameters 226 for the resolving actions of issues processed by the proposal system 204.

The proposal system 204 can be configured to statistically analyze the proposed actions 224 relative to operator-selected actions and outcome (for example, success or failure) of the actions. The results of the statistical analysis of the proposed actions 224 can include a confidence level of the proposal process. The confidence level can be compared to a threshold level to select a transition point from the proposal system 204 to the IRAS 206. For example, if a large majority (for example, over approximately 98%) of action proposals lead to successful issue resolution within a predetermined period of time (for example, one month), the proposal system 204 can be replaced by the IRAS 206.

The IRAS 206 can receive at least a portion of the configuration monitoring result 210 including the parameter set 214 from multiple production systems 204. The IRAS 206 can be configured to process issue information 208, additional information 210, and problem features 222 to retrieve action parameters and to determine a proposed action 224 associated with a particular action name 216. Statistical information on usage ranking or percentages can be used in a cost function of past issues with different degrees of similarity that are relevant for resolving a particular issue. The IRAS 206 can process groups of problem features 222 to generate clustered and filtered proposed actions 224. For example, proposed actions 224 that were previously successfully used can be differentiated from newly derived (proposed) proposed actions 224.

The IRAS 206 can be configured to process incident data (incident report) to determine scope of an incident. The incident report can be mapped to a software module and configuration. In some implementations, the incident report includes a "call stack" that includes a stack data structure that stores information about active subroutines of the software module corresponding to the incident. For example, in a case where a software module encountered a fatal error leading to an "abort" function, a call stack can be automatically created by the system. The incident report can include a set of software artifacts that relate to different software modules. The incident report can include framework code (for example, related to user interface (UI) and database (DB)) and logic. The software "artifacts" can be bundled in "packages" and the "packages" in "components." Typically, on a "package"- or "component"-level decided decision can be made if the artifact is associated with framework code or logic. For example, the software module related to an application logic can be relevant for optimization of configuration parameters. In some implementations, the incident report can also be created by a customer interacting with a graphical user interface (GUI). The incident report can include a context information related to the software module presenting a detected artifact. The incident report can include an error message of a particular software module. The error message can include an error code that can be mapped to the software module. In some implementations, the IRAS 206 can use a cost function that can be used to define, which aspect of a parameter set and an incident set has the highest priority. The cost function can identify scopes reported in incidents to be tested and can identify changed items, which are frequently used by multiple customers to be tested to avoid regression.

Figure 3:
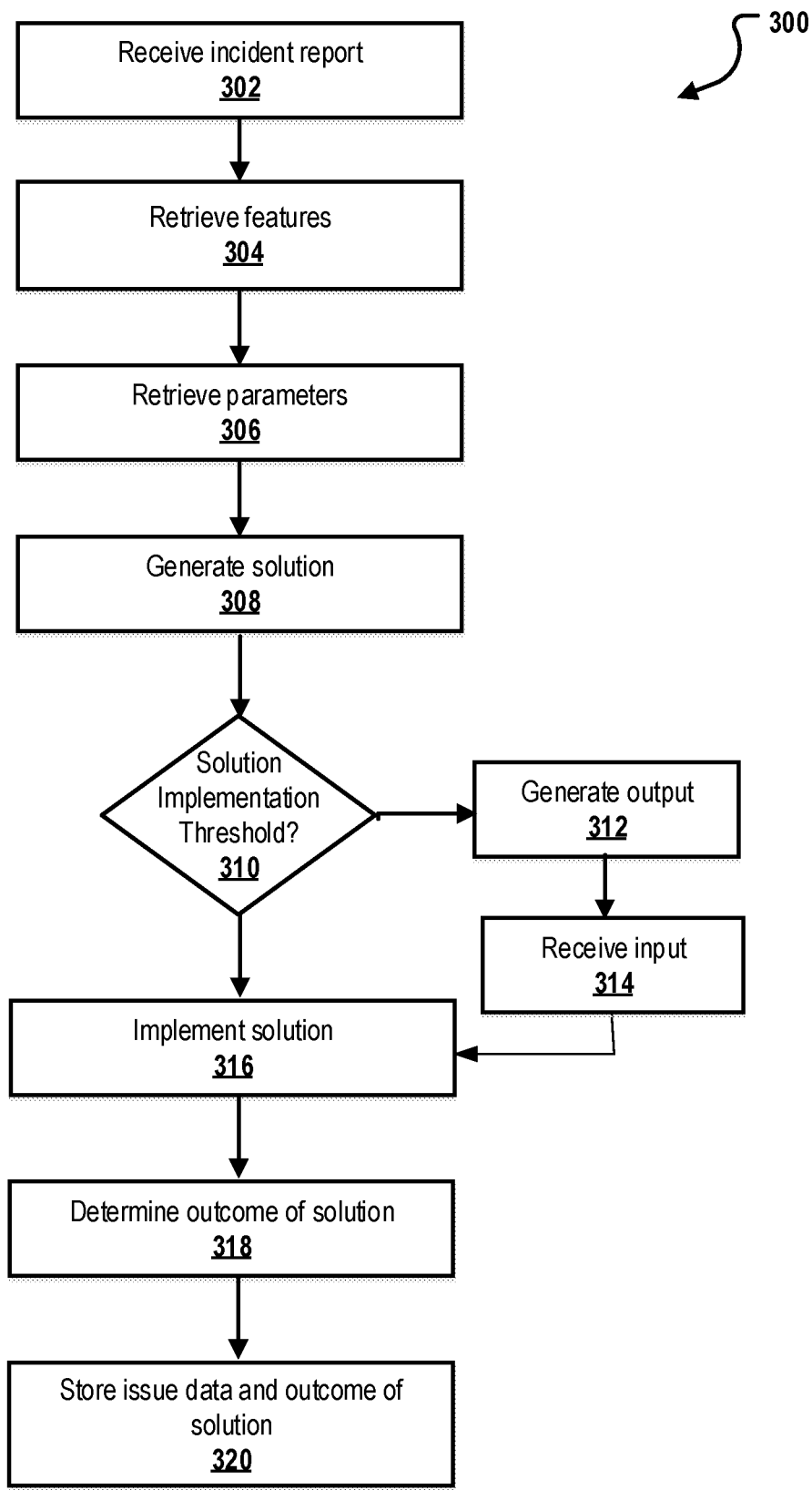
FIG. 3 is a flowchart illustrating an example of a computer-implemented method for issue resolution, according to some implementations of the present disclosure

FIG. 3 is a flowchart illustrating an example of a computer-implemented method 300 for issue resolution, according to some implementations of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate.

In some implementations, various steps of method 300 can be run in parallel, in combination, in loops, or in any order.

At 302, an incident report is received. The incident report can include data associated with one or more identified software artifacts, software modules, and configurations of the software modules. For example, the incident report can include a "call stack" including a stack data structure that stores information about the active subroutines of the software module corresponding to the incident. In case of a software module encountered a fatal error leading to an "abort" function, a call stack can be automatically created by the system. The incident report can include a set of software artifacts that relate to different software modules. The incident report can include framework code (related to UI, DB) and logic. The software "artifacts" can be bundled in "packages" and the "packages" in "components." Typically, on a "package" or "component" level it can be decided if the artifact is associated with a framework code or logic. For example, the software module related to an application logic can be relevant for optimization of configuration parameters. In some implementations, the incident report can also be created by a customer interacting with a graphical user interface. The incident report can include a context information related to the software module presenting a detected artifact. The incident report can include an error message of a particular software module. The error message can include an error code that can be mapped to the software module. The incident report can include a description of an issue of a process (procedure) and a context of the issue. Examples for process issues can include: issues provisioning a tenant for a particular product, issues with upgrading an instance, issues occurring during a backup, and issues occurring during a system update (for example, hardware extension or update). The context of the issue can include data visualized by the operating tools during an executed process. After 302, method 300 proceeds from 302 to 304.

At 304, features associated with the issue based on the context of the issue are retrieved. The features can include a description of the process and the error situation. The features can be extracted from issue information, additional context information and from feature annotations of an associated set of solutions previously stored in and retrievable from a database. The features can be extracted by performing a pattern-matching algorithm based on the context of the issue. After 304, method 300 proceeds to 306.

At 306, a set of parameters of a processing system executing the process are retrieved. The set of parameters can include software parameters (for example, variables) and hardware parameters (for example, number of connections, cache size, bandwidth, memory, processor frequency, or operand size). The set of parameters is retrieved based on parameter annotations of an associated set of solutions. After 306, method 300 proceeds to 308.

At 308, the features and parameters are processed to retrieve, from a database, a set of solutions that were previously executed to resolve associated issues. The set of solutions can be processed to select a solution from the set of solutions to resolve the issue. In some implementations, the solution can be selected using statistical tools. The statistical tools can include a classification of the solutions based on issue severity degree, features, and parameters. For example, the solution can be correlated with the parameter set to generate a classification (ranking) of solutions corresponding to the parameters relevant for issue resolution. After 3108, method 300 proceeds to 310.

At 310, it is determined whether an accuracy of the solution exceeds a solution implementation threshold. The solution implementation threshold can include a probability (for example, percentage) of solution success. After 310, method 300 proceeds to 312.

At 312, in response to determining that the solution implementation is below the solution implementation threshold, output can be generated for display. In some implementations, the output can include a summary of the incident report, a summary of the analysis and proposed solutions. In some implementations, IRAS determines data insights associated with software or system parameters relevant for issue resolution and development artifacts by end users, and the data insights are determined by calculating statistical values of the statistical data. In such implementations, IRAS enhances the efficiency of issue resolution. After 312, method 300 proceeds to 314.

At 314, an input is received. In some implementations, the input includes a solution to be implemented. The solution can be a new solution proposed by the operator or a modification of a proposed solution that was automatically generated. After 310 or 314, method 300 proceeds to 316.

At 316, the solution is implemented. Examples for implementations of solutions can include: an action to check compliance with constraints and their resolution, unlock of user or a user password, issuing or retrieving a new certificate, update (for example, scale-up/scale-out) instances to overcome resource shortages, increase configuration parameters (for example, number of connections, cache size, memory size, etc.), remove locks, deploy a patch (for example, modification of a system), or force restart a service. After 316, method 300 proceeds to 318.

At 318, an outcome (for example, success or failure) of the solution is determined. For example, in response to implementing the solution, the process that generated the issue is restarted and monitored to determine whether the same error or an associated error reappears. If no associated error occurs, the outcome of the solution is considered as being successful. After 318, method 300 proceeds to 320.

At 320, the issue data and the outcome of the implemented solution are transmitted to a database for storage. After 320, method 300 can stop or can loop back to 302.

Figure 4:
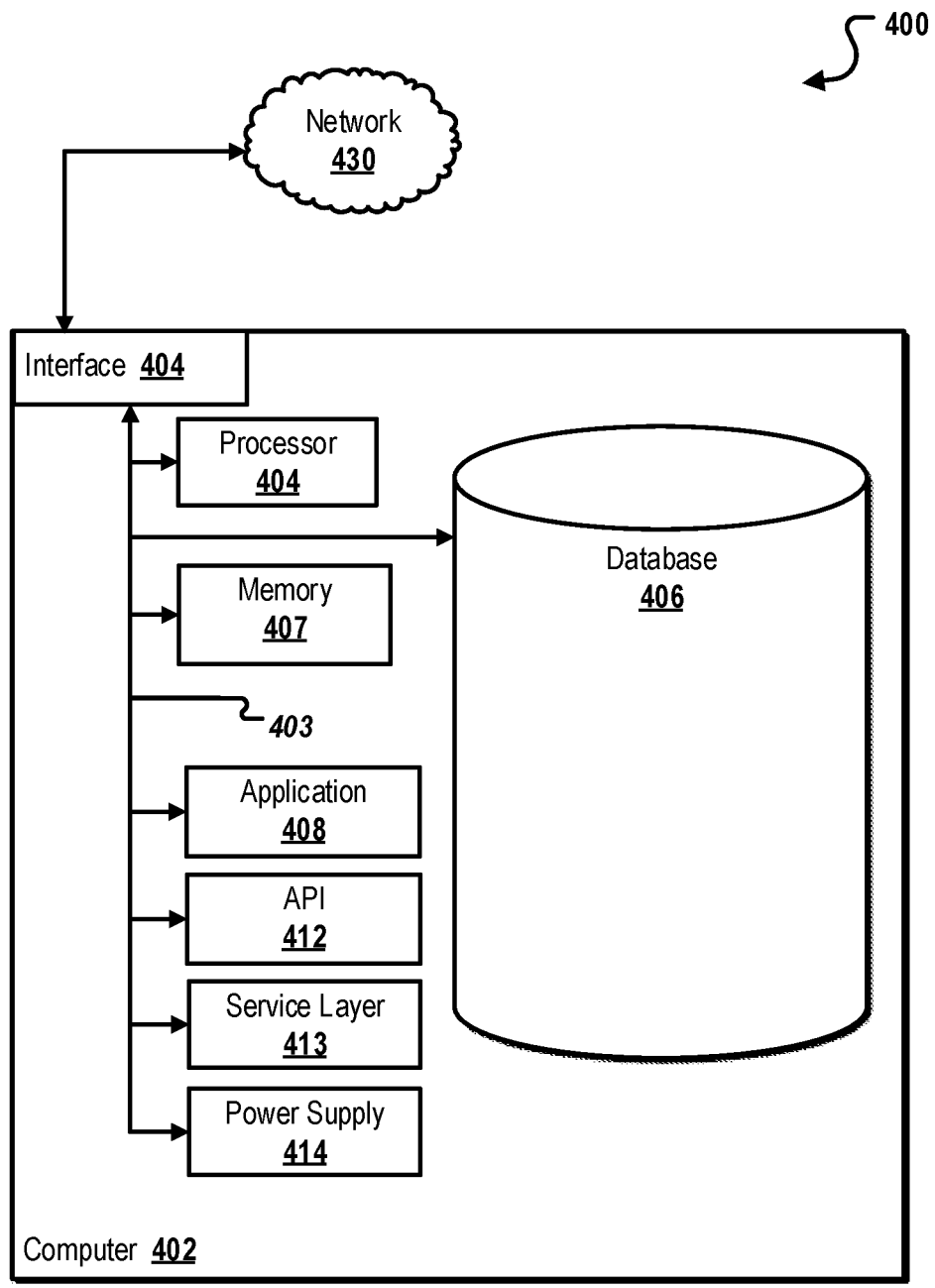
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 402 can include an input device, such as a keypad, keyboard, touch screen, another input device, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as a client, network component, a server, a database or another persistency, another role, or a combination of roles for performing image reconstruction as described in the present disclosure. The illustrated Computer 402 is communicably coupled with a Network 430. In some implementations, one or more components of the Computer 402 can be configured to operate within an environment, including cloud computing based, local, global, another environment, or a combination of environments.

At a high level, the Computer 402 is an electronic computing device operable to receive, transmit, process, store, or manage data and information associated with the described subject matter. According to some implementations, the Computer 402 can also include or be communicably coupled with a server, including an application server, email server, web server, caching server, streaming data server, another server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application-programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 402, some implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory, disk storage, or another type of database storing data consistent with the present disclosure. In some implementations, Database 406 can be a combination of two or more different database types (for example, a hybrid in-memory and disk storage database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in some implementations, Database 406 can be external to the Computer 402.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 of similar or differing types can be used according to particular needs, desires, or particular implementations of the Computer 402 and the described functionality. While Memory 407 is illustrated as an integral component of the Computer 402, in some implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in some implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple Computers 402.

Described implementations of the subject matter can include one or more features, alone or in combination.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client-computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

The foregoing and other described implementations can each, optionally, include one or more of the following features:

For example, in a first implementation, a computer-implemented method, includes: receiving, from a monitoring system, an incident report including a description of an issue of a process and a context of the issue, retrieving features associated with the issue based on the context of the issue, processing the features to extract a set of solutions that were executed to resolve associated issues, processing the set of solutions to generate a solution for the issue, determining whether an accuracy of the solution with a solution implementation threshold, and in response to determining that the accuracy of the solution exceeds the solution implementation threshold, implementing the solution to resolve the issue.

The foregoing and other described implementations can each, optionally, include one or more of the following features:

A first feature, combinable with any of the following features, wherein retrieving the features associated with the issue includes performing a pattern-matching algorithm based on the context of the issue.

A second feature, combinable with any of the previous or following features, wherein implementing the solution to resolve the issue includes scheduling the solution for automation by a development system.

A third feature, combinable with any of the previous or following features, further including retrieving a set of parameters of a processing system executing the process.

A fourth feature, combinable with any of the previous or following features, wherein retrieving the set of parameters is based on annotations of the set of solutions.

A fifth feature, combinable with any of the previous or following features, wherein implementing the solution to resolve the issue includes updating the set of parameters of the processing system to correctly perform the process.

A sixth feature, combinable with any of the previous or following features, wherein implementing the solution to resolve the issue includes updating the process.

In a second implementation, a non-transitory computer-readable storage medium coupled to one or more processors and having instructions stored thereon which, when executed by the one or more processors, cause the one or more processors to perform operations including: receiving, from a monitoring system, an incident report including a description of an issue of a process and a context of the issue, retrieving features associated with the issue based on the context of the issue, processing the features to extract a set of solutions that were executed to resolve associated issues, processing the set of solutions to generate a solution for the issue, determining whether an accuracy of the solution with a solution implementation threshold, and in response to determining that the accuracy of the solution exceeds the solution implementation threshold, implementing the solution to resolve the issue.

The foregoing and other described implementations can each, optionally, include one or more of the following features:

A first feature, combinable with any of the following features, wherein retrieving the features associated with the issue includes performing a pattern-matching algorithm based on the context of the issue.

A second feature, combinable with any of the previous or following features, wherein implementing the solution to resolve the issue includes scheduling the solution for automation by a development system.

A third feature, combinable with any of the previous or following features, the operations further including retrieving a set of parameters of a processing system executing the process.

A fourth feature, combinable with any of the previous or following features, wherein retrieving the set of parameters is based on annotations of the set of solutions.

A fifth feature, combinable with any of the previous or following features, wherein implementing the solution to resolve the issue includes updating the set of parameters of the processing system to correctly perform the process.

A sixth feature, combinable with any of the previous or following features, wherein implementing the solution to resolve the issue includes updating the process.

In a third implementation, non-transitory computer-readable medium storing one or more instructions executable by a computer system to perform operations, comprising receiving, from a monitoring system, an incident report including a description of an issue of a process and a context of the issue, retrieving features associated with the issue based on the context of the issue, processing the features to extract a set of solutions that were executed to resolve associated issues, processing the set of solutions to generate a solution for the issue, determining whether an accuracy of the solution with a solution implementation threshold, and in response to determining that the accuracy of the solution exceeds the solution implementation threshold, implementing the solution to resolve the issue.

The foregoing and other described implementations can each, optionally, include one or more of the following features:

A first feature, combinable with any of the following features, wherein retrieving the features associated with the issue includes performing a pattern-matching algorithm based on the context of the issue.

A second feature, combinable with any of the previous or following features, wherein implementing the solution to resolve the issue includes scheduling the solution for automation by a development system.

A third feature, combinable with any of the previous or following features, the operations further including retrieving a set of parameters of a processing system executing the process based on annotations of the set of solutions.

A fourth feature, combinable with any of the previous or following features, wherein implementing the solution to resolve the issue includes updating the set of parameters of the processing system to correctly perform the process.

A fifth feature, combinable with any of the previous or following features, wherein implementing the solution to resolve the issue includes updating the process.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client-computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Particular features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in particular combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In particular circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for issue resolution, the method being executed using one or more processors and comprising: receiving, by the one or more processors and from a monitoring system, an incident report comprising a description of an issue of a process and a context of the issue; retrieving, by the one or more processors, features describing the process associated with the issue based on the context of the issue, wherein the features are organized in groups of features; processing, by the one or more processors, the features to extract a set of solutions corresponding to the groups of features that were executed to resolve associated issues; processing, by the one or more processors, using machine learning, the set of solutions to generate a solution for the issue; determining, by the one or more processors, whether an accuracy of the solution exceeds a solution implementation threshold; and in response to determining that the accuracy of the solution exceeds the solution implementation threshold, implementing, by the one or more processors, the solution to resolve the issue by updating a software parameter or a hardware parameter before restarting the process.

2. The computer-implemented method of claim 1, wherein retrieving the features associated with the issue comprises performing a pattern-matching algorithm based on the context of the issue.

3. The computer-implemented method of claim 1, wherein implementing the solution to resolve the issue comprises scheduling the solution for automation by a development system.

4. The computer-implemented method of claim 1, further comprising retrieving a set of parameters of a processing system executing the process.

5. The computer-implemented method of claim 4, wherein retrieving the set of parameters is based on annotations of the set of solutions.

6. The computer-implemented method of claim 4, wherein implementing the solution to resolve the issue comprises updating the set of parameters of the processing system to correctly perform the process.

7. The computer-implemented method of claim 1, wherein implementing the solution to resolve the issue comprises updating the process.

8. A non-transitory computer-readable storage medium coupled to one or more processors and having instructions stored thereon which, when executed by the one or more processors, cause the one or more processors to perform operations for issue resolution, the operations comprising: receiving, from a monitoring system, an incident report comprising a description of an issue of a process and a context of the issue; retrieving features describing the process associated with the issue based on the context of the issue, wherein the features are organized in groups of features; processing the features to extract a set of solutions corresponding to the groups of features that were executed to resolve associated issues; processing, using machine learning, the set of solutions to generate a solution for the issue; determining whether an accuracy of the solution exceeds a solution implementation threshold; and in response to determining that the accuracy of the solution exceeds the solution implementation threshold, implementing the solution to resolve the issue by updating a software parameter or a hardware parameter before restarting the process.

9. The non-transitory computer-readable storage medium of claim 8, wherein retrieving the features associated with the issue comprises performing a pattern-matching algorithm based on the context of the issue.

10. The non-transitory computer-readable storage medium of claim 8, wherein implementing the solution to resolve the issue comprises scheduling the solution for automation by a development system.

11. The non-transitory computer-readable storage medium of claim 8, wherein the operations further comprise retrieving a set of parameters of a processing system executing the process.

12. The non-transitory computer-readable storage medium of claim 11, wherein retrieving the set of parameters is based on annotations of the set of solutions.

13. The non-transitory computer-readable storage medium of claim 11, wherein implementing the solution to resolve the issue comprises updating the set of parameters of the processing system to correctly perform the process.

14. The non-transitory computer-readable storage medium of claim 8, wherein implementing the solution to resolve the issue comprises updating the process.

15. A computer-implemented system, comprising: a client-side computing device; and a computer-readable storage device coupled to the client-side computing device and having instructions stored thereon which, when executed by the client-side computing device, cause the client-side computing device to perform operations for issue resolution, the operations comprising: receiving, from a monitoring system, an incident report comprising a description of an issue of a process and a context of the issue; retrieving features describing the process associated with the issue based on the context of the issue, wherein the features are organized in groups of features; processing the features to extract a set of solutions corresponding to the groups of features that were executed to resolve associated issues; processing, using machine learning, the set of solutions to generate a solution for the issue; determining whether an accuracy of the solution exceeds a solution implementation threshold; and in response to determining that the accuracy of the solution exceeds the solution implementation threshold, implementing the solution to resolve the issue by updating a software parameter or a hardware parameter before restarting the process.

16. The computer-implemented system of claim 15, wherein retrieving the features associated with the issue comprises performing a pattern-matching algorithm based on the context of the issue.

17. The computer-implemented system of claim 15, wherein implementing the solution to resolve the issue comprises scheduling the solution for automation by a development system.

18. The computer-implemented system of claim 15, wherein the operations further comprise retrieving a set of parameters of a processing system executing the process based on annotations of the set of solutions.

19. The computer-implemented system of claim 18, wherein implementing the solution to resolve the issue comprises updating the set of parameters of the processing system to correctly perform the process.

20. The computer-implemented system of claim 15, wherein implementing the solution to resolve the issue comprises updating the process.

* * * * *